United States Patent [19]

Glicksman et al.

[11] Patent Number: 5,010,112
[45] Date of Patent: Apr. 23, 1991

[54] METHOD AND APPARATUS FOR IMPROVING THE INSULATING PROPERTIES OF CLOSED CELL FOAM

[75] Inventors: Leon R. Glicksman, Lynnfield; Arlene J. Lanciani, Sterling, both of Mass.

[73] Assignee: Massachusetts Institute of Technology, Cambridge, Mass.

[21] Appl. No.: 444,673

[22] Filed: Dec. 1, 1989

[51] Int. Cl.$^5$ .............................. C08J 9/00; C08J 9/32
[52] U.S. Cl. ........................................................ 521/76
[58] Field of Search ........................................... 521/76

[56] References Cited

U.S. PATENT DOCUMENTS

| | | | |
|---|---|---|---|
| 4,094,685 | 6/1978 | Lester et al. | 521/76 |
| 4,137,199 | 1/1979 | Brown et al. | 521/118 |
| 4,572,869 | 2/1986 | Wismer et al. | 521/76 |
| 4,795,763 | 1/1989 | Gluck et al. | 521/99 |

*Primary Examiner*—Earl Nielsen
*Assistant Examiner*—John Cooney
*Attorney, Agent, or Firm*—Hamilton, Brook, Smith & Reynolds

[57] ABSTRACT

A filler of non-metallic, light transparent material is formed into particles or flakes and coated with opaque material and dispersed in closed cell foam to reduce overall thermal conductivity and, specifically, to reduce radiation heat transfer.

7 Claims, No Drawings

METHOD AND APPARATUS FOR IMPROVING THE INSULATING PROPERTIES OF CLOSED CELL FOAM

The Government has rights in this invention pursuant to subcontract No. 19X-09099C awarded by the U.S. Department of Energy.

BACKGROUND ART

The most efficient insulation used in buildings and appliances is closed cell foam polyurethane, polyisocyanerate or phenolic insulation. When new, this insulation has over twice the insulating value, per inch of thickness, as does fiberglass insulations. All refrigerators made today in the United States use closed cell foam for all of the surfaces, save the doors. About seven million refrigerators are sold in the United States every year. One-third of the interior volume of a refrigerator is foam insulation; industry representatives estimate that reducing insulation volume by one cubic foot would be worth $50.

About one-half of the buildings constructed used closed cell foam for roof or wall insulation. Use of boards made of foam as exterior sheathing is the most practical way 2×4 framed construction can meet the current energy standards.

Closed cell foam has excellent insulating characteristics because it contains chlorofluorocarbon, CFC, vapor within the cells. The CFC vapor has a thermal conductivity which is one-third that of air. Recently, it has been found that this CFC causes depletion of the stratospheric ozone layer. The United States and other developed nations have agreed to phase out the CFC use over the next decade. Replacement refrigerant vapors are not available at present. Replacements being considered have not completed toxicity tests, have higher projected costs, and there is little manufacturing capability in place for these replacements.

The replacements blowing agents also have higher thermal conductivity than present blowing agents. For the next decade, as CFC usage is phased out, manufacturers will probably use a foam which is blown with a mixture of CFC and $CO_2$. This mixture will yield a foam with a higher thermal conductivity than pure CFC blown foam.

To maintain present levels of energy efficiency, or appliances, there is a need to develop techniques which will reduce the overall thermal conductivity of foams blown with replacement blowing agents. In a foam filled with CFC, one-half of the heat transfer is by conduction through the vapor in the cell interior, one-third is by thermal radiation in the infrared wavelengths, and the balance is by conduction through the structure of the solid polymer. The radiation heat transfer is substantial because the cell walls are transparent to radiation and only the cell struts, formed at the intersection of three cell walls, are opaque.

If the cell walls of a foam can be made opaque, the radiation heat transfer can be reduced by more than 50%. Several investigators have tried adding opaque powders, or flakes, to the foam. In the Schuetz, M.S. thesis, M.I.T. (1982), experiments in the use of an opaque coal dust is described. More recently, in Torpey's thesis, M.I.T. (1987), the use of graphite and aluminum flakes is described. They showed that the overall thermal conductivity could be reduced by between 5 and 10% by the use of these materials. However, Torpey also shows that as a larger proportion of the flakes were added, the foam became more opaque, but the thermal conductivity reached a minimum and then began to rise as still more flakes are added to the polymer. U.S. Pat. No. 4,795,763, issued Jan. 3, 1989, describes a closed cell, rigid, polymer foam containing an opaque carbon black filler to reduce the aged K-factor of the foam.

SUMMARY OF THE INVENTION

We have found that the limitation on the overall conductivity reduction as opaque graphite or aluminum flakes are added, is due to two opposing trends. While the graphite, or aluminum, makes the foam more opaque, thus reducing the radiation heat transfer; at the same time, the addition of the graphite or aluminum to the polymer, makes the thermal conductivity higher, increasing conduction through the solid.

In accordance with the present invention, low thermal conductivity particles or flakes made of glass, ceramic, polymer or other non-metallic objects, are used as fillers to provide lower overall thermal conductivity of the foam. However, to combat the radiation heat transfer problem, these particles or flakes are coated with a very thin coating of opaque material, such as graphite or a metal. The coatings are very thin, one or more orders of magnitude less than a micron to achieve a low emissivity surface for the particles. Thus, the coated particles, which have dimensions in the micron size, are opaque and their average thermal conductivity (which is a volumetric property) is close to that of the base material. When these particles are mixed into the foam polymer, they result in lower radiation heat transfer, without an appreciable increase in the solid conductivity.

The coated particles can be made by vapor deposition, or other coating processes on particles. Or, they can be formed by coating larger pieces of low conductivity materials, such as hollow glass spheres, which are subsequently ground or crushed to the proper size.

DETAILED DESCRIPTION OF THE INVENTION

In accordance with the invention, a closed cell, rigid, polymer foam is formed with filler particle in the form of flakes or spheres disposed throughout the foam. The particles are formed of non-metallic, non-opaque material, such as glass, certain ceramics or polymers having low thermal conductivity and high thermal resistivity in the range of about 15 or more (h ft$^{20}$ F/Btu in) at pressure levels of 1/10–10 mm Hg. For example, powders of fused silica, precipitated silicon, perlite, fiberglass, a mixture of precipitated silica and fly ash, Pyrex®, C-Glass, solder glass, ceramic glass, mica, calcium, or carbonate, or mixtures thereof, may be used to form flakes or sphere filler particles. Other alternatives comprise 3M glass bubbles, mica platelets, and polyurethane foam.

The filler particles are then coated with an opaque material, such as graphite, aluminum, or carbon black by vapor deposition or other equivalent coating processes.

Alternatively, a thin opaque coating may be applied to the filler particles and the particles crushed before dispersing the filter into the foam.

The non-metallic filler, coated with opaque material, is sufficiently dispersed throughout the foam so as to lower the thermal conductivity, while at the same time, lowering the radiation heat transfer. About 2 to 10% by weight of filler is added to the foam materials which are insufficiently brittle at room temperature to grind in a ball mill ground at liquid nitrogen temperature. The polyurethane foam is cut or sliced into one or two cell sections and metallized by vapor deposition, or sputtering, and then ground.

Another coating technique is spraying, using a metal or graphite suspended in any aresol. One such product made by Borden Company and sold under the trademark KRYLON®.

Typically, in the formation of polymer foams, such as polyurethane or polyisosyanurates, two preformulated components on A-component and a B-component are formed. (See U.S. Pat. No. 4,795,763, column 4, lines 1-68.) The A-component contains an isocyanate compound, which is reacted with the polyyol of the B-component. The opaque coated filler can be dispersed in either component.

Among the numerous organic polymers which may be foamed in accordance with this invention, the following may be mentioned as examples: polystyrene, polyvinyl chloride, polyethylene, polypropylene, polyacrylonitrile, polybutadiene, polyisoprene, polytetrafluoroethylene, polyesters, melamine, urea, phenol resins, silicate resins, polyacetal resins, polyepoxides, polyhydantoins, polyureas, polyethers, polyurethanes, polyisocyanurates, polyimides, polyamides, polysulphones, polycarbonates, and copolymers and mixtures thereof.

Preferred filled foams of this invention are rigid polyurethane and polyisocyanurate foams. In the broadest aspects of the present invention, any organic polyisocyanate can be employed in the preparation of these foams. The organic polyisocyanates which can be used include aromatic, aliphatic and cycloaliphatic polyisocyanates and combinations thereof. Such polyisocyanates are described, for example, in U.S. Pat. Nos. 4,065,410, 3,401,180, 3,454,606, 3,152,162, 3,492,330, 3,001,973, 3,394,164 and 3,124,605, all incorporated herein by reference.

Representative of the polyisocyanates are the diisocyanates, such as m-phenlyene diisocyanate, toluene-2,4-diisocyanare, toluene-2,6-diisocyanate, mixtures of 2,4- and 2,6-toluene diisocyanate, hexamethylene-1,6-diisocyanate, tetramethylene-1,4-diieocyanate, cyclohexane-1,4-diisocyanate, hexahydrotoluene 2,4- and 2,6-diisocyanate, napthalene-1,5-diisocyanate, diphenyl methane-4,4'-diisocyanate, 4,4'-diphenylenediisocyanate, 3,3'-dimethoxy-4,4'-bibenyldiisocyanate, 3,3'-dimethyl-4,4'-biphenyidiieocyanata, and 3,3'-dimethyidiphenyimethane-4,4'-diisocyanate, and triisocyanates, such as 4,4',4''-triphenylmethanetriisocyanate, polymethylenepolyphenyl isocyanate, toluene-2,4,6-triisocyanate; and the tetraisocyanates, such as 4,4'-dimenthyidiphenyimethane-2,2',5,5'-tetraisocyanate. Especially useful are polymethylene polyphenyl polyisocyanates. These isocyanates are prepared by conventional methods known in the art, such as the phosgenation of the corresponding organic arsine.

Any suitable blowing agent can be employed in the foam compositions of the present invention. In general, these blowing agents are liquids having a boiling point between minus 50° C. and plus 100° C. and, preferably, between 0° C and 50° C. The preferred liquids are hydrocarbons or halohydrocarbons. Examples of suitable blowing agents include, among others, chlorinated and fluorinated hydrocarbons, such as trichlorofluoromethane, $CCl_2FCClF_2$, $CCl_2FCF_2$, trifluorochloropropane, difluorochloromethane, 1-fluoro-1,1-dichloroethane, 1,1-trifluoro-2,2-dichloroethane, 1,1-difluoro-1-chloroethane, methylene chloride, diethylether, isopropyl ether, n-pentane, cyclopentane, 2-methylbutane, methyl formate, carbon dioxide and mixtures thereof. $CO_2$ mixed with one of the CFC's is a preferred blowing agent.

Various surfactants, catalysts and additives may be included in the foam formulations, all as described in U.S. Pat. No. 4,795,763, cited above.

The opaque coated filler may be dispersed in the foam formulation by first grinding the filler material using a mill whereby coated flakes of filler are ground with the polyisocyanate foam formulation. The flakes should be at least 1-2 microns in major dimension in order to interfere with infrared waves. Preferably, they should be larger, so as to distribute evenly through the cell walls of the foam, but should not be too large and break. Platelet, or needle-like, geometry is preferred, since it maximizes surface area.

When the flakes are added to the polymer, it is important that the flake material be wettable to the polymer resin of the foam, and that it remain inert when combined with the polymer. To address this issue, flakes using the foam polymer coated with thermally opaque materials are under consideration. Uniform dispersion of the flakes should also take place more readily if the base material of the flakes is the foam polymer, because it is less likely to interfere with the foam's chemistry.

Filler material, if in powder form, can be suspended by vibrating with a mechanical vibratory plate. This is performed while coating the filler and produces uniform coating and discourages agglomeration.

The term "non-metallic", as used herein, is meant to include materials such as ceramics, with a relatively small amount of metallic content therein and which exhibit low thermal conductivity. For example, it is contemplated that pellets formed of clay, such as Kaolin, or china clay, ball clay, fine clay, beutanite, Fuller's earth, activated clays, enamel clays and filler clays, are useful as fillers which can be coated with opaque material. Also, the filler may be comprised of composites of two or more components that are essentially insoluble in each other. For example, glass-reinforced plastic, or fused silicon fibers embedded in plastic, may be used.

Opaque coated silicates, such as feldspar, mullite, or bauxite, may be used as filter material, provided the alumina content does not produce excessive thermal conductivity.

The coatings materials are preferably opaque metals, such as gold, aluminum, silver, or carbon. It is only necessary to apply a very thin coating of 50-100 Å; therefore, expensive materials, such as gold or silver, can be used.

We have also found one material which is both opaque and also has low thermal conductivity. This material is natural guanine, which is a derivative of fish scales and is sold under the trademark MEARLEMAID. This material is received as a liquid and allowed to dry and flake at room temperature and can be used as a filler without the added step of opaque coating.

This completes the description of the preferred embodiments of the invention.

EQUIVALENTS

Those skilled in the art will recognize, or be able to ascertain employing no more than routine experimentation, many equivalents to the specific structures, steps, functions and materials described specifically herein, and such equivalents are intended to be encompassed within the scope of the following claims:

We claim:

1. The method of forming a closed cell, rigid foam comprising the steps of:
   (a) forming a polymer foam;
   (b) forming a non-opaque, non-metallic foam filler dispersed in said polymer foam;
   (c) coating said filler with opaque material.

2. The method of claim 1 wherein the foam filler is taken from the group comprising non-metallic glass, ceramic, or polymer.

3. The method of claim 1 wherein the coating is taken from the group comprising graphite, aluminum, or carbon black.

4. A closed cell, rigid, foam insulating system comprising:
   (a) a polymer foam;
   (b) a non-opaque, non-metallic foam filler dispersed in said polymer foam; and
   (c) an opaque coating around said filler.

5. The system of claim 4 wherein the foam filler comprises a material from the group comprising glass, non-metallic ceramic, or non-metallic polymer.

6. The system of claim 4 comprising the coating from the group comprising graphite, aluminum or carbon black.

7. An opaque heat insulative system comprising:
   (a) an insulative foam; and
   (b) flakes of natural guanine dispersed throughout said foam.

* * * * *